Sept. 14, 1926.  H. J. FERRIS  1,599,703
STANCHION
Filed Nov. 30, 1925  2 Sheets-Sheet 2
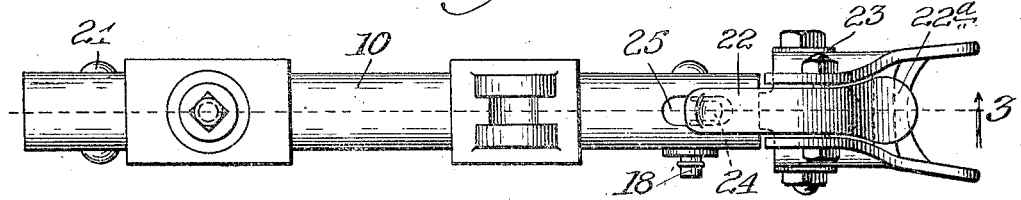
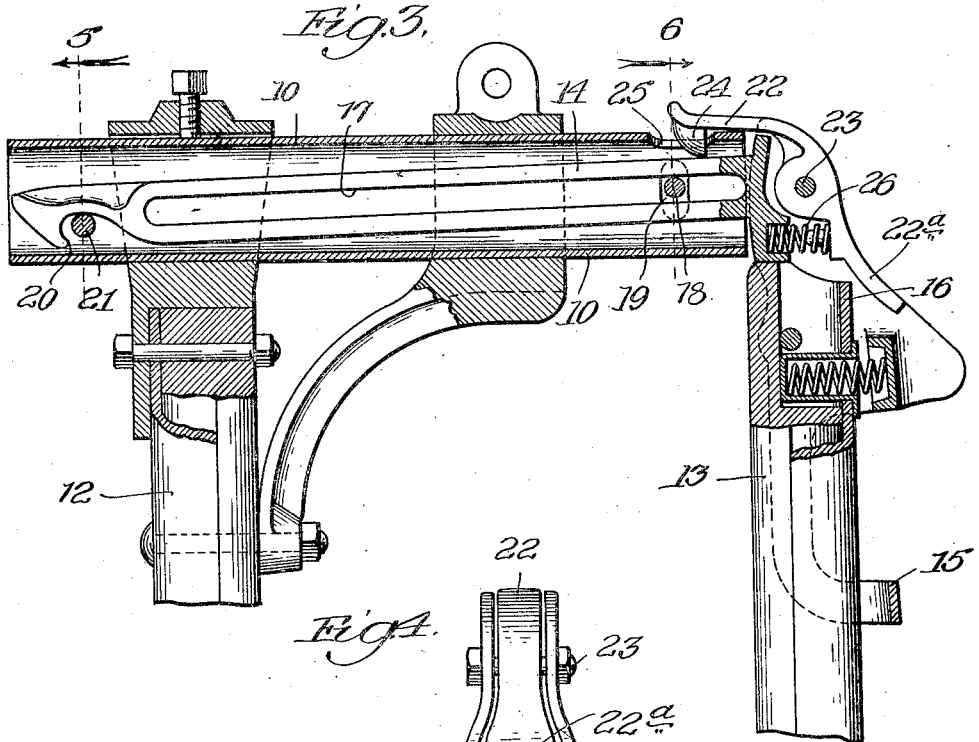
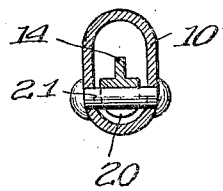
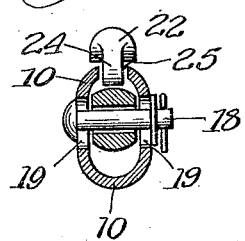
Inventor:
Howard J. Ferris,
By Dyrenforth, Lee, Chritton and Wiles,
Attys.

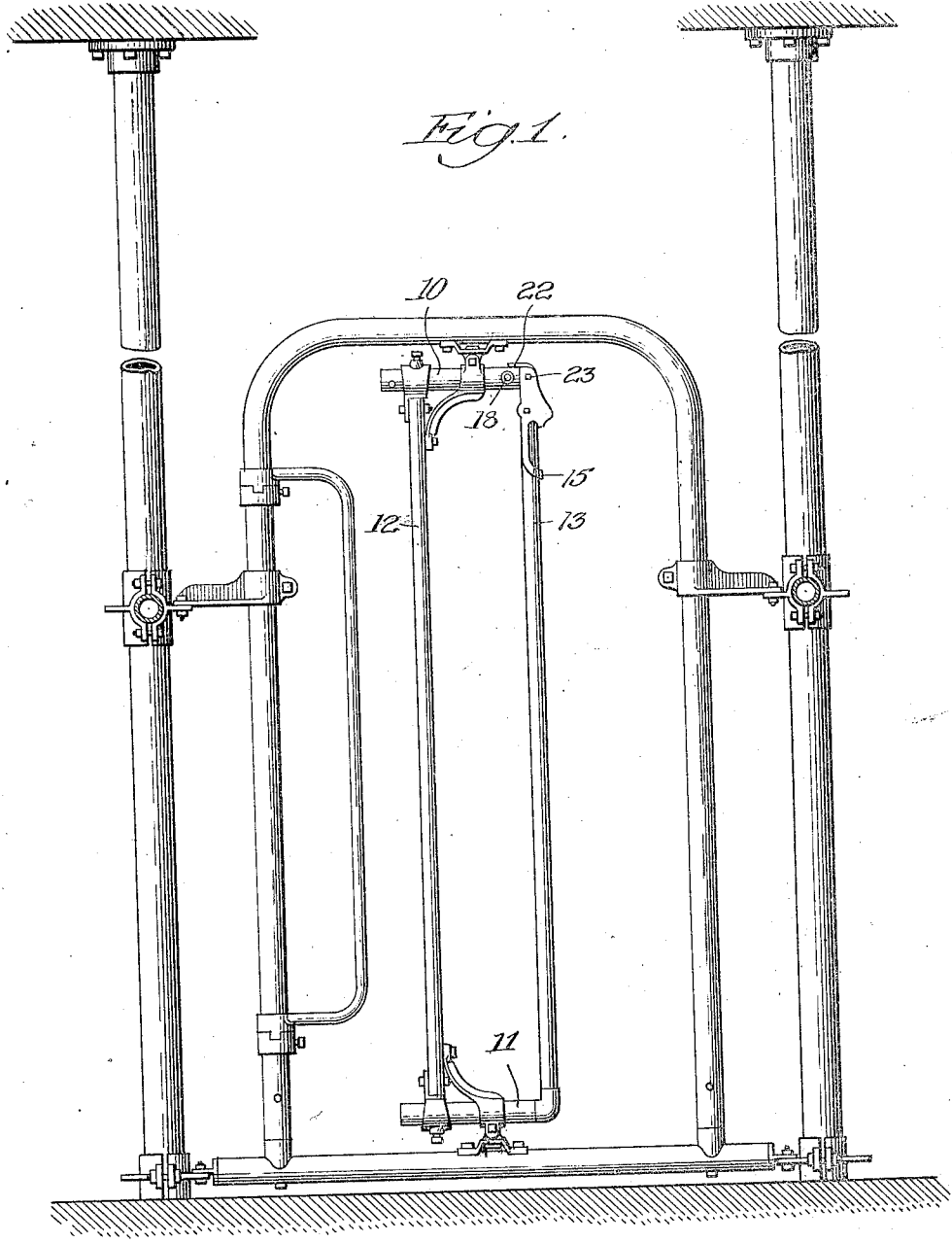

Patented Sept. 14, 1926.

1,599,703

UNITED STATES PATENT OFFICE.

HOWARD J. FERRIS, OF HARVARD, ILLINOIS, ASSIGNOR TO HUNT, HELM, FERRIS & COMPANY, A CORPORATION OF ILLINOIS.

STANCHION.

Application filed November 30, 1925. Serial No. 72,193.

This invention relates to stanchions and is fully described in the following specification and shown in the accompanying drawings, in which:—

Figure 1 is a front elevation of a stanchion mounted in a stall front;

Fig. 2 is an enlarged top plan view of the stanchion;

Fig. 3 is a partial section on the line 3 of Fig. 2;

Fig. 4 is an end elevation of the same; and

Figs. 5 and 6 are vertical sections on the lines 5 and 6 respectively of Fig. 3.

In the embodiment illustrated, the stanchion consists of top and bottom bars 10 and 11 respectively, connected by means of a fixed side bar 12 and having a movable side bar 13 hingedly connected to the bottom bar 11. The top bar 10 is hollow so as to receive the finger 14 which is integral with the operating lever 15 and hingedly connected at 16 to the upper end of the side bar 13. The finger 14 has a longitudinal slot 17 through which passes a pin 18 which is loosely mounted at its two ends in slots 19 as shown in Fig. 6. This serves as a stop for the outer swing of the side bar 13 while the side slots 19 permit the rod 18 to move up and down to permit the movement of the finger 14.

The outer end of the finger 14 carries a hook 20 which is adapted to engage the pin 21 in the hollow top bar 10 when the side bar 13 is moved to closed position.

A latch member 22 is hingedly carried in the operating lever 15 by means of a pin 23 and has a hook 24 which is adapted to engage an opening 25 in the upper surface of the top bar 10 when the side bar is closed. The lower end 22ª lies in a depression in the operating lever 15 and carries a spring 26 which normally presses the hook 24 toward the finger 14.

Thus it will be seen that in order to open the stanchion it is necessary to simultaneously lift both of the hooks 20 and 24. To do this the operator grasps the lever 15 and the upper portion of the side bar 13, his thumb resting upon the end of the lever 22ª. A pressure will then result in lifting both of the hooks 20 and 24 so that they will clear the pin 21 and the edge of the opening 25 respectively when the movable bar 13 can be drawn back. With a single fastening means it has often been possible for a cow to swing her head so that her horn strikes the releasing mechanism on the movable side bar when, if her neck happens to be pressing on the side bar it will open and the cow will be released. By this arrangement, however, a second locking means is provided which is so located that the cow cannot strike it with her horn and consequently she will be unable to open the stanchion.

To close the stanchion, the side bar 13 is forced inwardly when the sloping end of the hook 20 will ride up over the pin 21, when gravity will cause it to drop into position as shown in Fig. 3. At the same time the sloping end of the hook 24 will ride up over the outer end of the hollow top bar 10 until the hook 24 is able to drop into the opening 25.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:—

1. In a stanchion, a top tube and a movable side bar, a finger hingedly connected to the side bar and having a hook adapted to engage a pin in the top tube, and a spring pressed latch member hingedly connected to said finger and adapted to engage a portion of said top tube.

2. In a stanchion, a hollow top bar and a movable side bar, a latch finger hingedly connected to the side bar and adapted to engage a portion of the top bar, and a spring pressed latch member hingedly carried by said movable bar and adapted to engage a portion of said top bar.

3. In a stanchion, a hollow top bar and a movable side bar, a finger hingedly connected to the side bar and having a hook adapted to engage a pin in the top bar, and a spring pressed latch member hingedly connected to said finger and adapted to engage a portion of said top bar, said latch member lying partly in a depression in said finger so as to be protected thereby.

4. In a stanchion, a hollow top bar and a movable side bar, a finger hingedly connected to the side bar and having a hook adapted to engage a pin in the top bar, a spring pressed latch member hingedly connected to said finger and adapted to engage a portion of said top bar, said finger having a longitudinal slot, and a pin extending transversely of said top bar and loosely mounted in slots therein.

5. In a stanchion, a tube and a movable side bar, a finger hingedly connected to the side bar and adapted to engage a portion of the tube, and a spring pressed latch member hingedly carried by said movable bar and adapted to engage a portion of said tube, one latch locking within the tube and the other locking on the outside of said tube.

In testimony whereof I have hereunto set my hand this 24 day of November 1925.

HOWARD J. FERRIS.